United States Patent
Solie

(10) Patent No.: US 9,246,348 B2
(45) Date of Patent: Jan. 26, 2016

(54) BATTERY CHARGE MODULATOR WITH BOOST CAPABILITY

(75) Inventor: Eric M. Solie, Durham, NC (US)

(73) Assignee: INTERSIL AMERICAS LLC., Milpitas, CA (US)

(*) Notice: Subject to any disclaimer, the term of this patent is extended or adjusted under 35 U.S.C. 154(b) by 296 days.

(21) Appl. No.: 13/479,390

(22) Filed: May 24, 2012

(65) Prior Publication Data

US 2013/0088203 A1 Apr. 11, 2013

Related U.S. Application Data

(60) Provisional application No. 61/544,044, filed on Oct. 6, 2011, provisional application No. 61/544,058, filed on Oct. 6, 2011.

(51) Int. Cl.
*H02J 7/00* (2006.01)
*H02J 7/02* (2006.01)
*H02J 7/04* (2006.01)

(52) U.S. Cl.
CPC .. *H02J 7/022* (2013.01); *H02J 7/04* (2013.01)

(58) Field of Classification Search
USPC ......................................................... 320/129
See application file for complete search history.

(56) References Cited

U.S. PATENT DOCUMENTS

| | | | |
|---|---|---|---|
| 5,625,275 A | | 4/1997 | Tanikawa et al. |
| 6,144,187 A | * | 11/2000 | Bryson .......................... 320/137 |
| 6,329,796 B1 | * | 12/2001 | Popescu ........................ 320/134 |
| 7,528,582 B1 | * | 5/2009 | Ferguson ....................... 320/164 |
| 7,719,236 B2 | | 5/2010 | Hartular |
| 2009/0167245 A1 | | 7/2009 | Nguyen |
| 2009/0174366 A1 | | 7/2009 | Ahmad et al. |
| 2010/0026208 A1 | * | 2/2010 | Shteynberg et al. .......... 315/297 |

FOREIGN PATENT DOCUMENTS

| | | |
|---|---|---|
| CN | 1838503 A | 9/2006 |
| CN | 102207766 A | 10/2011 |

* cited by examiner

*Primary Examiner* — Jack Chiang
*Assistant Examiner* — Bryce Aisaka
(74) *Attorney, Agent, or Firm* — Gary Stanford

(57) ABSTRACT

A system and method for controlling a converter of a power stage receiving an adapter current for providing current to a load. The converter is operative in a buck mode for charging a battery and in a boost mode for discharging the battery to the load to supplement adapter current. The adapter current is compared with a predetermined level to develop a control signal, and at least one pulse control signal is developed based on the control signal and used to control the modulator. The modulator operates the converter in the buck mode when the adapter current up to the predetermined level, and operates the converter in the boost mode when the adapter current exceeds the predetermined level. The battery current may also be monitored to adjust the control signal to limit battery charge or discharge current in both modes.

22 Claims, 4 Drawing Sheets

BATTERY CHARGE MODULATOR WITH BOOST CAPABILITY

CROSS-REFERENCE TO RELATED APPLICATIONS

This application claims the benefit of U.S. Provisional Application Ser. No. 61/544,044, filed on Oct. 6, 2011, and U.S. Provisional Application Ser. No. 61/544,058, filed on Oct. 6, 2011, which are both hereby incorporated by reference in their entireties for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In a conventional battery charger an adapter provides power for both the battery charger and the system load. As the system load increases, the charging current is decreased such that the adapter current does not go over its limit. Once the charging current has been decreased to zero, any additional system load causes the adapter to go over its limit.

Certain configurations allow the system load to draw much more than the maximum power rating of the adapter. This can persist for a period of time (e.g., several seconds) until a temperature rating is exceeded or until the task is completed. As an example, Intel Corporation has introduced a "turbo" mode to its Sandy Bridge and Ivy Bridge central processing units (CPU's) which allow the CPU to temporarily exceed the power rating of the adapter, which condition may persist until the CPU gets too hot or otherwise completes its task.

The condition of exceeding the power rating of the adapter raises a safety concern. To avoid tripping an over-current condition on the adapter, a battery charge modulator as described herein is operated backwards in a boost mode to provide discharge current from the battery to the system load. As the system load increases above the adapter power limit, the battery discharge current increases to prevent the adapter from going over its maximum current limit. Detecting when to boost and how to control the converter is a subject of this disclosure. Furthermore, a battery discharge current limit is provided, which may be a function of the charge current limit.

Figure 1:
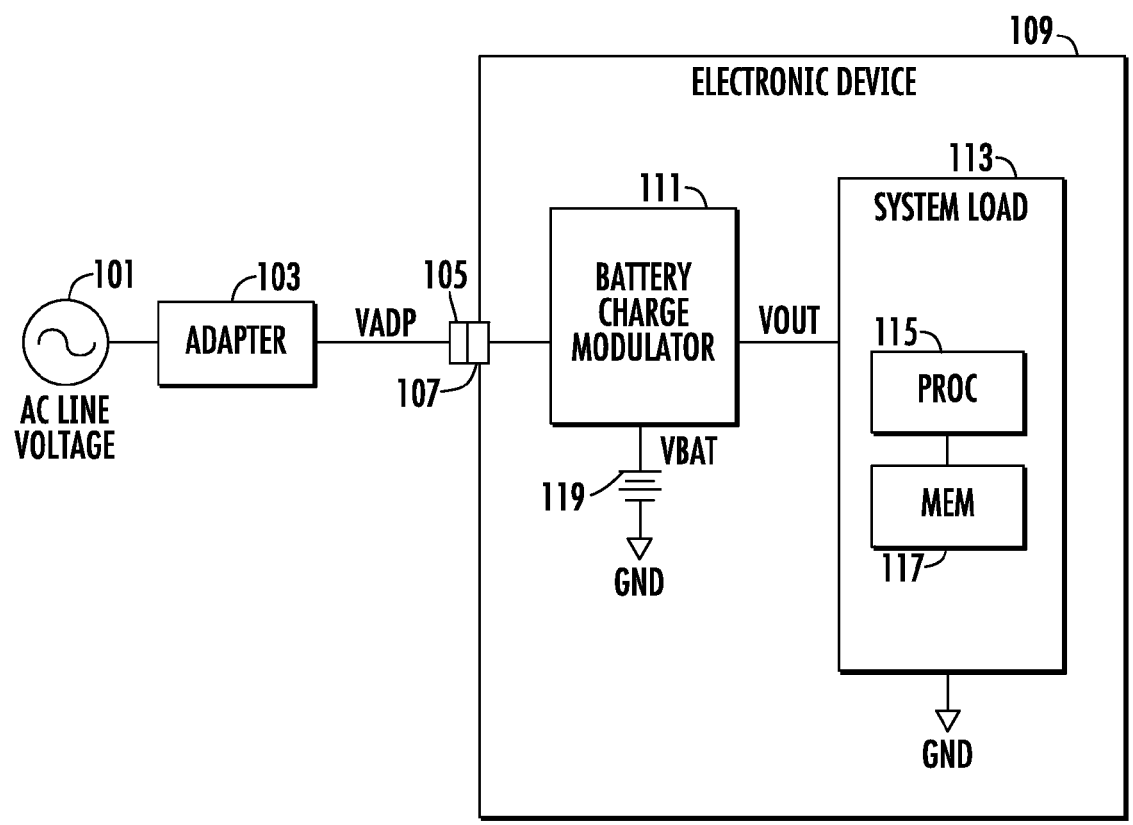
FIG. 1 is a simplified block diagram of an electronic device including a battery charge modulator implemented according to an embodiment of the present invention.

FIG. 1 is a simplified block diagram of an electronic device 109 including a battery charge modulator 111 implemented according to an embodiment of the present invention. An AC line voltage shown at 101 is provided to the input of an AC adapter 103, which converts the AC voltage to a DC adapter voltage VADP. VADP is shown provided to a suitable connector 105, which mates with a compatible connector 107 provided to the electronic device 109. In this manner, VADP is provided to an input of the battery charge modulator 111, which provides an output voltage VOUT to a system load 113. A rechargeable battery 119 provides a battery voltage VBAT to another input of the battery charge modulator 111 for developing VOUT when the adapter 103 is not available. The battery 119 and the system load 113 are shown referenced to ground (GND), where is it understood that GND generally represents any suitable positive or negative voltage level and/or multiple ground types, such as power ground, signal ground, analog ground, chassis ground, etc.

The electronic device 109 may be any type of electronic device, including mobile, portable, or handheld devices, such as, for example, any type of personal digital assistant (PDA), personal computer (PC), portable computer, laptop computer, etc., cellular phone, personal media device, etc. The primary functions of the electronic device 109 are performed by the system load 113, which may include one or more different system load elements. In the illustrated embodiment, the system load 113 includes a processor, such as a microprocessor or controller or the like, which is coupled to any combination of any type of memory commonly used for electronic devices, such as various types of RAM and ROM and the like.

Figure 2:
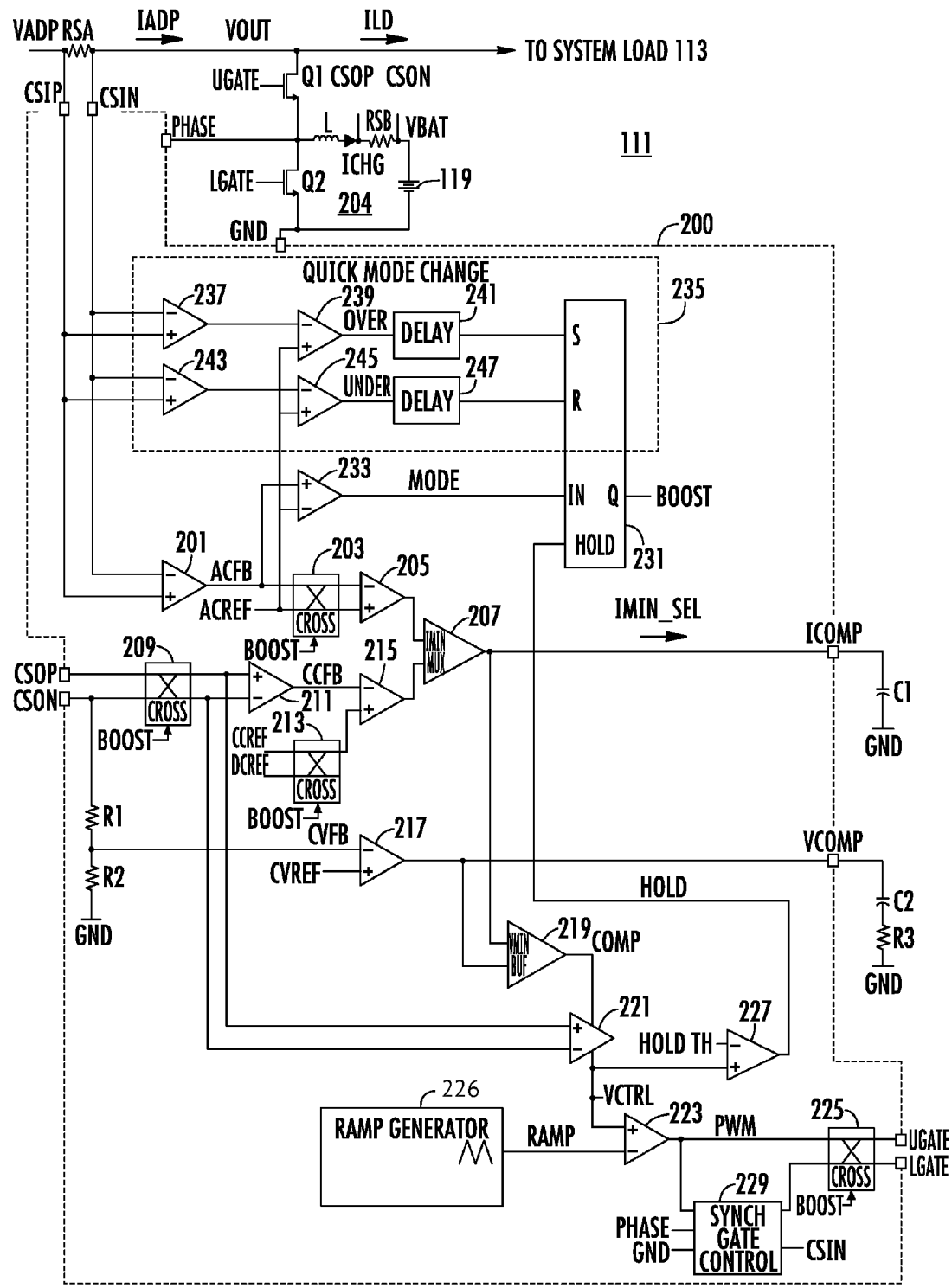
FIG. 2 is a more detailed schematic and block diagram of the battery charge modulator of FIG. 1 implemented according to one embodiment of the present invention.

FIG. 2 is a more detailed schematic and block diagram of the battery charge modulator 111 implemented according to one embodiment of the present invention. The battery charge modulator 111 includes a controller 200 and a power stage 204 which includes, or which is otherwise coupled to, the battery 119, which may be removable. The power stage 204 includes a converter formed by electronic switches Q1 and Q2 and an inductor L, which is operative in either a "buck" mode to charge the battery 119 using VADP from the adapter 103, and a "boost" mode to boost the voltage of the battery 119 in order to discharge the battery 119 to the system load 113.

VADP is provided to one end of a sense resistor RSA which is coupled to a node CSIP configured as an input to the controller 200. In one embodiment, the controller 200 is implemented on an integrated circuit (IC) in which the input/output (I/O) nodes (shown with square symbols) are implemented as pins of the IC, although discrete implementations are contemplated as well. A node and pin are referred to with the same name unless otherwise indicated herein. The other end of RSA is coupled to node CSIN as another pin of the controller 200. Although not shown, there may be filtering elements (e.g., resistance, capacitance, or combination thereof) coupled in series with the CSIN and CSIP pins.

Node CSIN is also used as (or otherwise coupled to) the output node of the battery charge modulator 111 developing the output voltage VOUT provided to the system load 113. Node CSIN is coupled to the drain of electronic switch Q1, having its source coupled to the drain of electronic switch Q2 at a PHASE node. The source of Q2 is coupled to GND. The PHASE node is configured as a pin of the controller 200 which is coupled to one end of the inductor L, having its other end coupled to node CSOP which is coupled to one end of another sense resistor RSB. The other end of RSB is coupled to node CSON which is further coupled to the positive terminal of the battery 119, having its negative terminal coupled to GND. CSOP and CSON are configured as pins of the controller 200, and CSOP develops the battery voltage VBAT. Although not shown, there may be filtering elements (e.g., resistance, capacitance, or combination thereof) coupled in series with the CSON and CSOP pins. A switching device, such as a transistor device or the like, may be coupled between VBAT and VOUT to provide battery power to the system load 113 when the adapter 103 is disconnected.

In the illustrated embodiment, the electronic switches Q1 and Q2 may each be implemented as N-channel metal oxide semiconductor field effect transistors (MOSFETs) as known to those skilled in the art. Other types of electronic switching devices may be used including other types of FETs and the like, and other types of transistors, such as bipolar junction transistors (BJTs) or insulated-gate bipolar transistors (IGBTs) and the like, etc.

The converter (switches Q1 and Q2 and the inductor L) and the sense resistor RSB collectively implement the power stage 204 of the battery charge modulator 111. The operation of the power stage 204 is controlled by the controller 200 as further described herein. An adapter current IADP flows through the sense resistor RSA when the adapter 103 is connected. A charge current ICHG flows through the sense resistor RSB denoting charge current to the battery 119. ICHG also denotes a discharging current when in the boost mode as further described below when the battery 119 is also providing power (discharging). A load current ILD is shown flowing out of the power stage 204 providing load current to the system load 113.

In one embodiment, the voltage VBAT of the battery 119 ranges between about 9 to 13 Volts (V) and the adapter voltage VADP is about 19V. The CSIN node is coupled to the "system bus" node developing VOUT at about 19V. In the illustrated embodiment, the power stage 204 is operated in a buck converter mode (or buck mode) when the battery 119 is being charged and ICHG is positive, and the power stage 204 is operated in a boost converter mode (or boost mode) to boost the battery voltage to the adapter voltage level when the battery 119 is discharging and ICHG is negative. A negative ICHG (−ICHG) may also be referred to as a positive discharge current IDCHG.

The CSIP and CSIN nodes/pins are provided to the noninverting or positive (+) and inverting or negative (−) inputs, respectively, of a current sense amplifier 201 within the controller 200 for sensing the adapter current IADP. The output of the sense amplifier 201 develops an adapter current feedback (ACFB) voltage provided to an upper input of a crossover multiplexer (CROSS MUX) 203. An adapter current reference (ACREF) voltage is provided to the lower input of the CROSS MUX 203, which receives a control signal BOOST. The upper right output of the CROSS MUX 203 is provided to the negative input of an adapter current error amplifier 205 and the lower right output of the CROSS MUX 203 is provided to the positive input of an error amplifier 205. The output of the error amplifier 205 is provided to one input of a minimum current select MUX (IMIN MUX) 207.

The CSOP and CSON nodes are provided to the upper and lower inputs, respectively, of another CROSS MUX 209 controlled by the signal BOOST. The upper and lower outputs of the CROSS MUX 209 are provided to the positive and negative inputs, respectively, of a charge sense amplifier 211 for sensing the charge current ICHG. The output of the sense amplifier 211 develops a charge current feedback (CCFB) voltage provided to the negative input of a charge current error amplifier 215. A charge current reference voltage CCREF is provided to the upper input of another CROSS MUX 213, and a discharge current reference voltage DCREF is provided to the lower input of the CROSS MUX 213. The upper output of the CROSS MUX 213 is provided to the positive input of the error amplifier 215. The output of the error amplifier 215 is provided to the other input of the IMIN MUX 207. The output of the IMIN MUX 207 is coupled to a node ICOMP, which is further coupled to a compensation capacitor C1 coupled between ICOMP and GND. In the illustrated embodiment, C1 is provided external to the controller 200 to enable adjustment of compensation and/or to enable other suitable forms of compensation as desired.

Error amplifiers 205, 215 and 217 are transconductance (gm) amplifiers providing current signals at their outputs. The IMIN MUX 207 selects the lowest or "more negative" current level (larger current sink) of the error amplifiers 205 and 215 and provides a current IMIN_SEL to charge the capacitor C1 to develop an ICOMP voltage on the ICOMP node. If both currents are positive, the lower current is selected as IMIN_SEL; if one current is positive and the other negative, the negative current is selected as IMIN_SEL; if both currents are negative, the current with the larger magnitude (more negative) is selected as IMIN_SEL.

The CSON node senses the battery voltage VBAT and is provided to a resistor voltage divider including resistors R1 and R2 coupled in series within the controller 200 between node CSON and GND. The intermediate junction of the resistors R1 and R2 develops a charge voltage feedback voltage CVFB, which is provided to the negative input of a charge voltage error amplifier 217. A charge voltage reference voltage CVREF is provided to the positive input of the error amplifier 217. The output of the error amplifier 217 is coupled to a node VCOMP, which is further coupled to a compensation circuit including a capacitor C2 and resistor R3 coupled in series between VCOMP and GND. In the illustrated embodiment, C2 and R3 are provided external to the controller 200 to enable adjustment of compensation.

The ICOMP and VCOMP nodes are provided to respective inputs of a VMIN buffer 219, which selects the lower one of the ICOMP and VCOMP voltage levels as a COMP voltage at its output. The upper and lower outputs of the CROSS MUX 209 are also provided to the positive and negative inputs, respectively, of an amplifier 221, which receives COMP at one terminal and which provides a control voltage VCTRL at another terminal. If the gain of the amplifier 221 is G, then the amplifier 221 operates to generate VCTRL=COMP−G (CSOP-CSON). The gain G of the amplifier 221 is a relatively low gain to implement a low gain inner current loop as further described herein.

VCTRL is provided to the positive input of a pulse width modulation (PWM) comparator 223, which receives a RAMP voltage at its other input and which develops a PWM signal at its output. RAMP is provided by a ramp generator 226, in which RAMP is shown as a triangular ramp or the like (although alternative ramp configurations are contemplated). In one embodiment, RAMP oscillates at a predetermined clock frequency. In one embodiment, the frequency of RAMP is approximately 400 kilohertz (KHz). RAMP is compared with VCTRL by the comparator 223 to develop PWM. PWM is provided to the upper input of a CROSS MUX 225 and to an input of a synchronous gate controller 229. The synchronous gate controller 229 is coupled to the PHASE and GND nodes (coupled to the power stage 204) and provides an output to the lower input of the CROSS MUX 225. In one embodiment, the synchronous gate controller 229 may also be coupled to the CSIN node for sensing the drain to source voltage (VDS) of Q1 for implementing diode emulation in boost mode if desired. The upper output of the CROSS MUX 225 is coupled to node UGATE provided to the gate of Q1, and the lower output of the CROSS MUX 225 is coupled to node LGATE provided to the gate of Q2.

VCTRL is also provided to the positive input of a hold comparator 227, which receives a hold threshold voltage HOLD TH at its negative input. HOLD TH is set to a voltage below a minimum level of the RAMP voltage, which ramps between a minimum ramp voltage RAMP VALLEY and a peak ramp voltage RAMP PEAK. HOLD TH is set at a voltage below RAMP VALLEY by a predetermined amount, which is generally selected as equal to or greater than a sum of expected offset voltages of the comparators 223 and 227 to ensure that the comparator 227 switches at a lower voltage threshold than the comparator 223. The output of the hold comparator 227 provides a signal HOLD to the HOLD input of a latch 231. A boost comparator 233 receives ACFB and ACREF at its positive and negative inputs, respectively, and has an output providing a signal MODE to the IN input of the latch 231. The BOOST signal is provided at the Q output of the latch 231.

The ramp generator 226, the comparator 223, the synchronous gate controller 229 and the CROSS MUX 225 collectively form a modulator which drives UGATE and LGATE based on the control voltage VCTRL to control the converter portion of the power stage 204. In buck mode, the modulator portion drives the converter according to buck operation for charging the battery 119. In boost mode, the outputs of the modulator are reversed by the CROSS MUX 225 for driving the converter according to boost operation for discharging the battery 119. It is noted that alternative modulators and modulator types may be used to provide the boost functionality.

A quick mode change circuit 235 includes current sense amplifiers 237 and 243, comparators 239 and 245, and delay blocks 241 and 247. The CSIP and CSIN nodes are coupled to the positive and negative inputs, respectively, of each of the sense amplifiers 237 and 243. The output of the sense amplifier 237 is provided to the positive input of the comparator 239, which receives ACREF at its negative input and which provides an OVER signal to the input of the delay block 241. The output of the delay block 241 is provided to the set (S) input of the latch 231. The output of the sense amplifier 243 is provided to the negative input of the comparator 245, which receives ACREF at its positive input and which provides an UNDER signal to the input of the delay block 247. The output of the delay block 247 is provided to the reset (R) input of the latch 231.

Each CROSS MUX (203, 209, 213, 225) operates in the same manner as controlled by BOOST. In normal or "buck" mode, BOOST is low and each CROSS MUX passes its inputs straight through to its outputs, so that the upper input is coupled to the upper output and the lower input is coupled to the lower output. In boost mode when BOOST is asserted high, the inputs are cross-coupled to the outputs so that the upper input is instead coupled to the lower output and the lower input is instead coupled to the upper output. It is noted that each CROSS MUX (203, 209, 213, 225) may be placed at other locations of the respective signal paths to invert the corresponding signals.

The voltage across sense resistor RSA (between the CSIP and CSIN nodes) indicating the adapter current IADP is gained up by sense amplifier 201 (e.g., gain of 20) and level shifted relative to GND to provide the ACFB voltage. When BOOST is low, ACFB and ACREF (adapter current reference) pass directly through to the error amplifier 205 to develop a first control current signal. In a similar manner, the voltage across sense resistor RSB (between the CSOP and CSON nodes) indicating battery charge current ICHG is gained up by sense amplifier 211 (e.g., gain of 20) and level shifted relative to GND to provide the CCFB voltage. When BOOST is low, CCFB and CCREF (charge current reference) are provided to the error amplifier 215 to develop a second control current signal. The more negative current level (as previously described) is selected by the IMIN MUX 207 provided as IMIN_SEL compensated by the ICOMP node (via capacitor C1). In this manner, the amplifier that is requesting less current is selected as potentially controlling operation.

The battery voltage VBAT developed on CSON is provided to the resistor divider R1 and R2. The error amplifier 217 compares the battery voltage feedback to CVREF (charge voltage reference), and the output of the error amplifier 217 drives the VCOMP node.

The charge current output is measured across CSOP-CSON and sets up the low gain inner current loop to de-Q the power stage 204. As shown, when BOOST is low, CSOP and CSON are provided to the amplifier 221 to adjust the VCTRL signal with COMP. In one embodiment, the amplifier 221 has a relatively low gain (e.g., gain of 5). The VMIN buffer 219 selects the lesser voltage of ICOMP and VCOMP as COMP which feeds the inner current loop where a multiple (e.g., 5) of the charge current voltage value is subtracted from COMP to develop VCTRL.

VCTRL is compared to RAMP to generate PWM to control switching of Q1 and Q2 of the power stage 204. In buck mode when BOOST is low, PWM controls UGATE for controlling switching of Q1, and the synchronous gate controller 229 controls LGATE for controlling switching of Q2. In buck mode, the power stage 204 is operated as a buck-type converter since the voltage of VBAT is less than VADP. During buck mode, when PWM goes high, UGATE is driven high to turn on Q1 and when PWM goes low, UGATE is driven low to turn off Q1. Dead time control may be implemented so that Q1 and Q2 are not turned on at the same time. In buck mode, Q2 is turned on after Q1 is turned off during each PWM cycle.

The switch Q1 or Q2 that is not driven by PWM is referred to as the "synchronous" switch. When in buck mode and not in boost mode, Q1 is the main switch and Q2 is the synchronous switch. In one embodiment, the synchronous switch is driven to emulate a diode (diode emulation). In particular, when the current through the inductor L reaches about zero after PWM goes low during the cycle in buck mode, Q2 is turned off for the remainder of the cycle. In order to make this determination, the synchronous gate controller 229 compares the voltage of PHASE with GND to determine the drain to source voltage (VDS) of Q2 and turns Q2 off when they are about equal (which may be relative to a predetermined offset voltage). CSIN may be provided to the synchronous gate controller 229 to monitor the VDS of Q1 to operate Q1 in diode emulation during boost mode, if desired.

When in boost mode, the PWM signal drives LGATE instead to control switching of Q2 (main switch in boost mode) and Q1 is the synchronous switch. In boost mode, the battery 119 discharges through RSB and the power stage 204 is operated as a boost-type converter. While the discharge current is above a continuous current mode (CCM)/discontinuous current mode (DCM) threshold, Q1 is operated in synchronous mode and is generally switched to the opposite state as Q2. Thus, when Q2 is turned on, Q1 is off and vice-versa (though both may not be turned on at the same time according to dead time control operation) during each PWM cycle above the CCM/DCM threshold. When the discharge current is below the CCM/DCM threshold in boost mode, however, Q1 is kept off in which its body diode becomes operative. There are other techniques to control the synchronous switch as understood by those skilled in the art.

The CCM/DCM threshold may be determined based on the input voltage VADP (at CSIP), the output voltage VOUT, the inductance L of the inductor L, and the frequency of operation, which is the frequency of RAMP. In one embodiment, VADP and the RAMP frequency are relatively fixed, so that the CCM/DCM threshold varies according to VOUT. In another embodiment, the CCM/DCM threshold is predetermined based on an average level of VOUT. Thresholds other than the CCM/DCM boundary may be chosen depending upon the particular implementation or operating parameters.

One of the error amplifiers 205, 215 and 217 controls operation as selected by the IMIN MUX 207 and the VMIN buffer 219. Essentially, whichever device operates to demand less current or voltage to reduce the duty cycle of PWM controls loop operation. In buck mode when BOOST is low, while VCTRL remains above the HOLD TH voltage level, the hold comparator 227 asserts the HOLD signal high to keep the HOLD input of the latch 231 high to keep BOOST latched low. If VCTRL falls below HOLD TH, the PWM pulses reduce to zero and the hold comparator 227 asserts HOLD low to release the HOLD input of the latch 231. The comparator 233 then asserts MODE high when ACFB rises above ACREF, which causes BOOST to go high. When BOOST goes high, each of the CROSS MUXs 203, 209, 213 and 225 switch state to enter the boost mode of operation.

When BOOST is asserted high in boost mode, the inputs to error amplifier 205 flip which causes ICOMP, COMP and VCNTRL to rise. Once VCTRL rises above HOLD TH and PWM pulses are once again generated, then the state of BOOST is latched and it does not change until VCTRL goes below the HOLD TH once again unless switched by the quick mode change circuit 235, which is further described below. When the system load decreases while in boost mode such that ACFB is just below the ACREF set point, the ACFB is lower then ACREF and VCTRL is driven down and MODE is low. When VCTRL goes below HOLD TH, the hold comparator 227 pulls HOLD low which pulls the HOLD input of the latch 231 low, so that BOOST goes low to switch to the buck mode.

In summary, in buck mode when BOOST is low, each of the CROSS MUXs 203, 209, 213 and 225 couples its input straight through to its output and the power stage 204 is operated as a normal buck mode modulator. In this case, one of ACFB<ACREF or CCFB<CCREF drives COMP and VCTRL higher, the PWM signal drives UGATE and the inner current loop is configured for negative feedback. When BOOST goes high for boost mode, then each of the CROSS MUXs 203, 209, 213 and 225 cross-couples its inputs to its output resulting in the power stage 204 operating in boost mode to boost the battery voltage up to the voltage level of VADP. In this case ACFB<ACREF and CCFB<CCREF and CVFB<CVREF drives COMP lower, the PWM signal drives LGATE, and the inner current loop is reconfigured for negative feedback.

The adapter control loop generally regulates ACFB=ACREF in steady state while the adapter is at its current limit up to when the battery reaches its discharge current limit, as described herein. However under system load steps that involve a boost mode change, it can be slow because either ICOMP or VCOMP has to discharge to pull VCTRL to HOLD TH to switch between modes. The quick mode change circuit 235 facilitates relatively fast switching between buck and boost modes.

The gain of the current sense amplifier 237 is lower than the gain of the current sense amplifier 201 by a predetermined amount, and the comparator 239 compares the output of amplifier 237 with ACREF. While in buck mode, if the adapter current IADP quickly increases in response to a load increase step such that ACFB rises above ACREF by a corresponding amount, then the comparator 239 switches and asserts OVER high. If OVER remains high at least for the duration of the delay block 241, then the delay block 241 triggers and sets the latch 235 to pull BOOST high to switch to the boost mode regardless of the state of IN or HOLD.

In one embodiment, the gain of the current sense amplifier 237 is about 10% lower than the gain of the current sense amplifier 201 (e.g., gain of 18), so that when ACFB is about 10% above ACREF for the delay period, operation switches to boost mode. In one embodiment, the delay of the delay block 241 is in a range of about 100-200 microseconds (μs) to achieve relatively fast response without tripping in response to spurious signals. The delay may be any suitable amount in alternative configurations.

Similarly, the gain of the current sense amplifier 243 is higher than the gain of the current sense amplifier 201 by a predetermined amount, and the comparator 245 compares the output of amplifier 243 with ACREF. While in boost mode, if the adapter current IADP quickly decreases in response to a load decrease such that ACFB falls below ACREF by a corresponding amount, then the comparator 245 switches and asserts UNDER high. If UNDER remains high at least for the duration of the delay block 247, then the delay block 247 triggers and resets the latch 235 to pull BOOST low to switch back to the buck mode regardless of the state of IN or HOLD.

In one embodiment, the gain of the current sense amplifier 243 is about 10% higher than the gain of the current sense amplifier 201 (e.g., gain of 22), so that when ACFB is about 10% under ACREF for the delay period, operation switches from boost to buck mode. In one embodiment, the delay of the delay block 247 is also about 100 μs to achieve relatively fast response without tripping in response to spurious signals.

The quick mode change circuit 235 enables faster transitioning between the buck and boost modes of operation in response to faster load transients. The delay blocks 241 and 247 insert sufficient delay to avoid switching between the buck and boost modes in response to momentary spikes or load transitions that do not have sufficient duration to justify switching modes. The delays of the delay blocks 241 and 247 are sufficiently short to enable switching between modes faster than the adapter and battery control loops.

The reference values ACREF, CCREF, DCREF and CVREF may be fixed at predetermined levels. Alternatively, one or more of the reference values may be programmable. In a programmable configuration, one or more internal or external programmable devices (not shown) provide one or more of the programmable reference values.

Often a rechargeable battery, such as the battery 119, is rated for a different discharge current as compared to the charge current. For example, the battery 119 may be rated for a larger discharge current as compared to its charge current. In the buck mode, the CROSS MUX 213 selects CCREF provided to the error amplifier 215 for regulating the maximum charge current level. In the boost mode, the CROSS MUX 213 selects DCREF provided to the error amplifier 215 for regulating the maximum discharge current level. If the maximum charge and discharge currents are the same or about the same, then a single charge reference may be used and provided directly to the error amplifier 215 for regulating both the maximum charge and discharge current levels.

Figure 3:
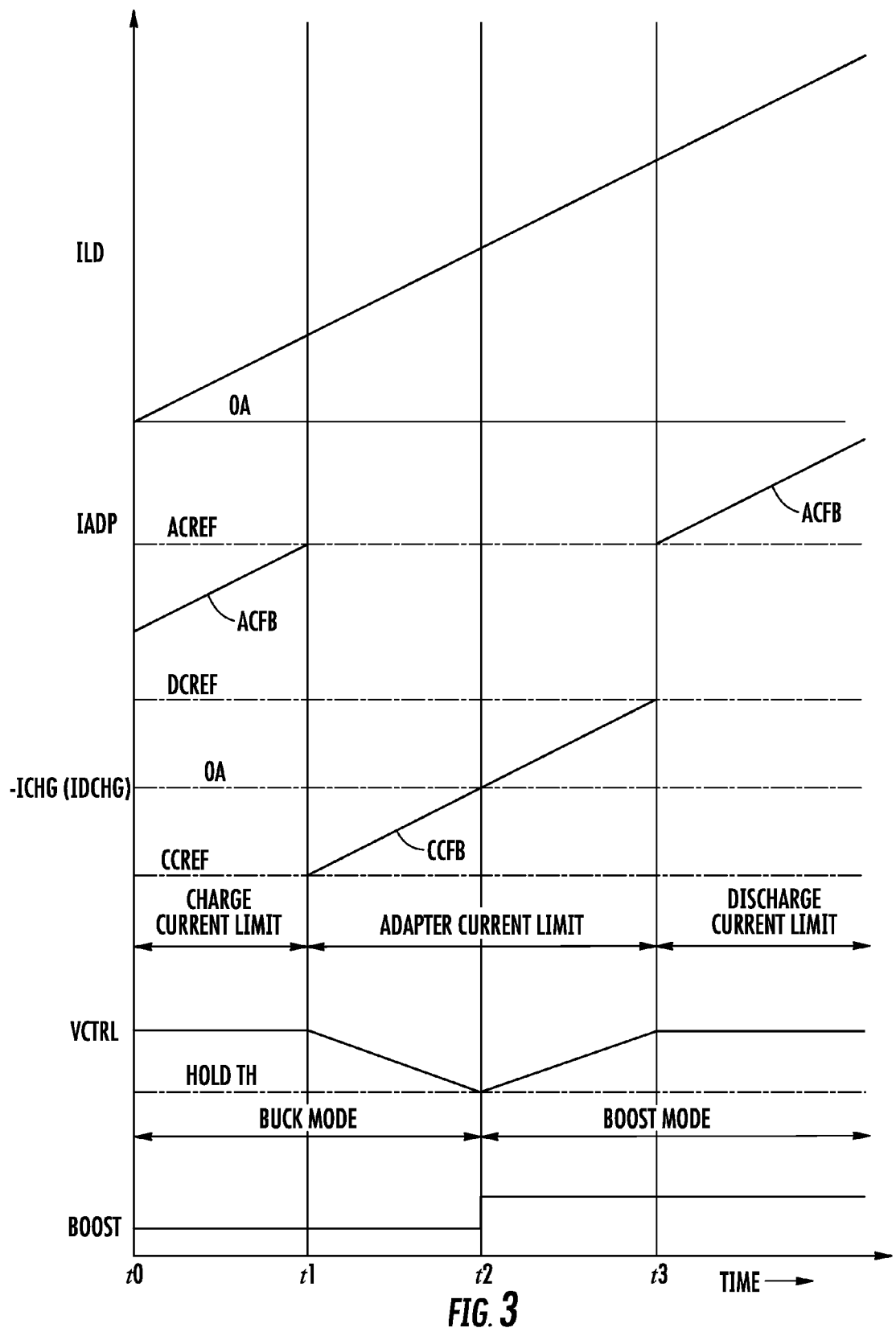
FIG. 3 is a simplified graph diagram plotting selected signals illustrating operation of the battery charge modulator of FIG. 1 according to one embodiment.

FIG. 3 is a simplified graph diagram plotting the load current ILD, the adapter current (IADP), the battery discharge current (−ICHG, or IDCHG), compensation control voltage VCTRL, and the BOOST signal versus time illustrating operation of the battery charge modulator 111 according to one embodiment. ILD is plotted relative to zero (0 Amperes or "0 A") and ramps up from 0 A at a constant rate to an indefinite current level, IADP is indicated by ACFB and is plotted relative to ACREF, −ICHG is indicated by CCFB plotted between DCREF and CCREF and relative to 0 A, COMP is plotted relative to HOLD TH, and BOOST is a binary or digital value which is asserted low (or logic "0") for buck mode, and is asserted high (or logic "1") for boost mode of operation.

Operation of the error amplifier 217 is ignored or otherwise not illustrated, in which it is assumed that the battery 119 is not at its maximum voltage level. It is noted that when the battery 119 is fully charged, the amplifier 217 prevents the buck mode (or allows only minimal buck operation) to prevent further charging of the battery 119. Boost mode, however, may be used when the load attempts to draw more current than the adapter can provide, in which case the battery 119 is discharged to supplement load current. When the battery 119 is not fully charged, loop control is between the error amplifiers 205 and 215. The graph diagram plots the load current ILD provided to the system load 113, the adapter current IADP as indicated by ACFB and relative to ACREF, the negative charge current −ICHG through the battery 119 relative to CCREF (buck mode) and DCREF (boost mode), the COMP voltage relative to the HOLD TH voltage level, and the BOOST signal. The negative charge current −ICHG may also be referred to as the discharge current (IDCHG). The load current ILD is shown increasing at a linear rate from zero to a high value to illustrate control operation. The change of ILD during this time is assumed to be sufficiently slow and operation of the quick mode change circuit 235 is not illustrated or otherwise ignored.

At a first time t0, operation is in buck mode in which the load current ILD is low or zero Amperes (A), so that ACFB, indicative of the adapter current IADP, is relatively low. Since ILD is at or near zero, substantially all of the adapter current flows through RSB to charge the battery 119. It is assumed that the battery 119 is not fully charged and that its voltage is sufficiently low that it absorbs full charge current. Thus, CCFB (charge current feedback) reaches or otherwise attempts to exceed CCREF (charge current reference) and the error amplifier 215 controls the COMP to limit battery charge current to its maximum level as determined by CCREF. After time t0 up to a subsequent time t1 while ILD increases, ACFB rises proportional to ILD while remaining below ACREF, and error amplifier 215 remains in control to limit charging current to the maximum level determined by CCREF. The period between times t0 and t1 is a charge current limit period.

At time t1, ILD rises to a point in which ACFB (adapter current feedback) reaches or begins to exceed ACREF (adapter current reference). ACREF indicates the maximum adapter current level, so that the error amplifier 205 starts attempting to reduce the current level while ILD continues to rise after time t1. At about time t1, the error amplifier 205 assumes control to limit the adapter current to the maximum level determined by ACREF. As ILD continues to rise, the error amplifier 205 limits the adapter current level so that the charging current through the battery 119 begins to decrease. In this manner, the charging current begins to decrease (or −ICHG increases) so that more current is available for ILD provided to the system load 113. The period after time t1 begins the adapter current limit period.

After time t1 while ILD continues to increase, IADP is held constant based on ACREF and −ICHG continues to increase (charging current decreases). The level of VCTRL decreases to a level that keeps IADP constant while supplying the full level of ILD requested by the system load 113. Between time t0 and subsequent time t2, ILD remains below the maximum adapter current and the balance of current is provided to the battery 119 as charge current.

At subsequent time t2, ILD reaches the maximum adapter current and the charge current goes to zero. VCTRL has decreased to about the voltage of HOLD TH. As ILD continues to rise, the hold comparator 227 switches HOLD low to release the HOLD input of the latch 231. ACFB rises above ACREF and the latch 231 switches to assert BOOST high to initiate the boost mode of operation.

After time t2 in the boost mode of operation, the power stage 204 switches to boost mode and the battery 119 discharges to provide current to ILD. As ILD rises, the error amplifier 205 maintains control to limit the adapter current to its maximum level determined by ACREF. As ILD continues to rise, the error amplifier 205 adjusts COMP to control the power stage 204 operating in boost mode to increase the discharge current level of the battery 119. Thus, while IADP remains at its maximum level, VCTRL rises as ILD rises to increase the discharge current −ICHG to supply the balance of current to ILD. The adapter current limit period in effect from time t2 to a subsequent time t3 to maintain the adapter current at its maximum desired level.

At subsequent time t3, the discharge current of the battery 119 reaches the maximum discharge current level determined by DCREF. At time t3 the ILD current level has reached the sum of the maximum current levels of the adapter 103 and the discharge current level of the battery 119. The level of ILD should not attempt to exceed this maximum current level for an appreciable period of time. If ILD does increase as illustrated after time t3, however, the error amplifier 215 resumes control to prevent the discharge current from the battery 119 from exceeding its maximum level as indicated by DCREF. After time t3, operation enters a discharge current limit period in which the discharge current level of the battery 119 is maintained at its maximum allowed level. In this manner, the battery 119 is protected from exceeding its maximum discharge current rating level to protect the battery and/or to optimize safety.

If ILD continues to increase as illustrated after time t3, the discharge current level of the battery 119 is limited so that the additional current is provided by the adapter 103. Thus, the adapter 103 exceeds its maximum current level. The system bus voltage level of VOUT may begin to decrease depending upon the configuration of the adapter 103. This condition may be allowed to continue for a limited time so long as the adapter 103 does not exceed its maximum current level for an appreciable amount of time or VOUT does not decrease by an appreciable amount. In one embodiment, ILD may be allowed to rise above the maximum current level of both the adapter 103 and the battery 119 for a limited time period. If ILD persists above the maximum current level of both the adapter 103 and the battery 119, then a fault or error condition may be detected by additional protection circuitry or the like (not shown), and the electronic device 109 may be shut down to prevent fault conditions, damage, or catastrophic failure.

Operation is substantially similar in the opposite direction as ILD decreases. The battery 119 supplements excess load current not provided by the adapter and the discharge current decreases while the load current decreases. When ACFB falls below ACREF and VCTRL falls below HOLD TH, operation switches back to the buck mode. As previously described, the synchronous gate controller 229 operates Q2 in diode emulation mode in which Q2 is turned off when the inductor current drops to about zero as determined by monitoring the VDS of Q2. In one embodiment, the synchronous gate controller 229 implements a minimum on-time of Q2 during buck mode to provide a relatively small level of boost current even during buck mode. This boost function in buck mode operates to prevent premature switching to boost mode and to minimize or reduce switching oscillation at the buck/boost switch point. In one embodiment, CSIN may be provided to the synchronous gate controller 229 to monitor the VDS of Q1 to operate Q1 according to diode emulation during boost mode.

Figure 4:
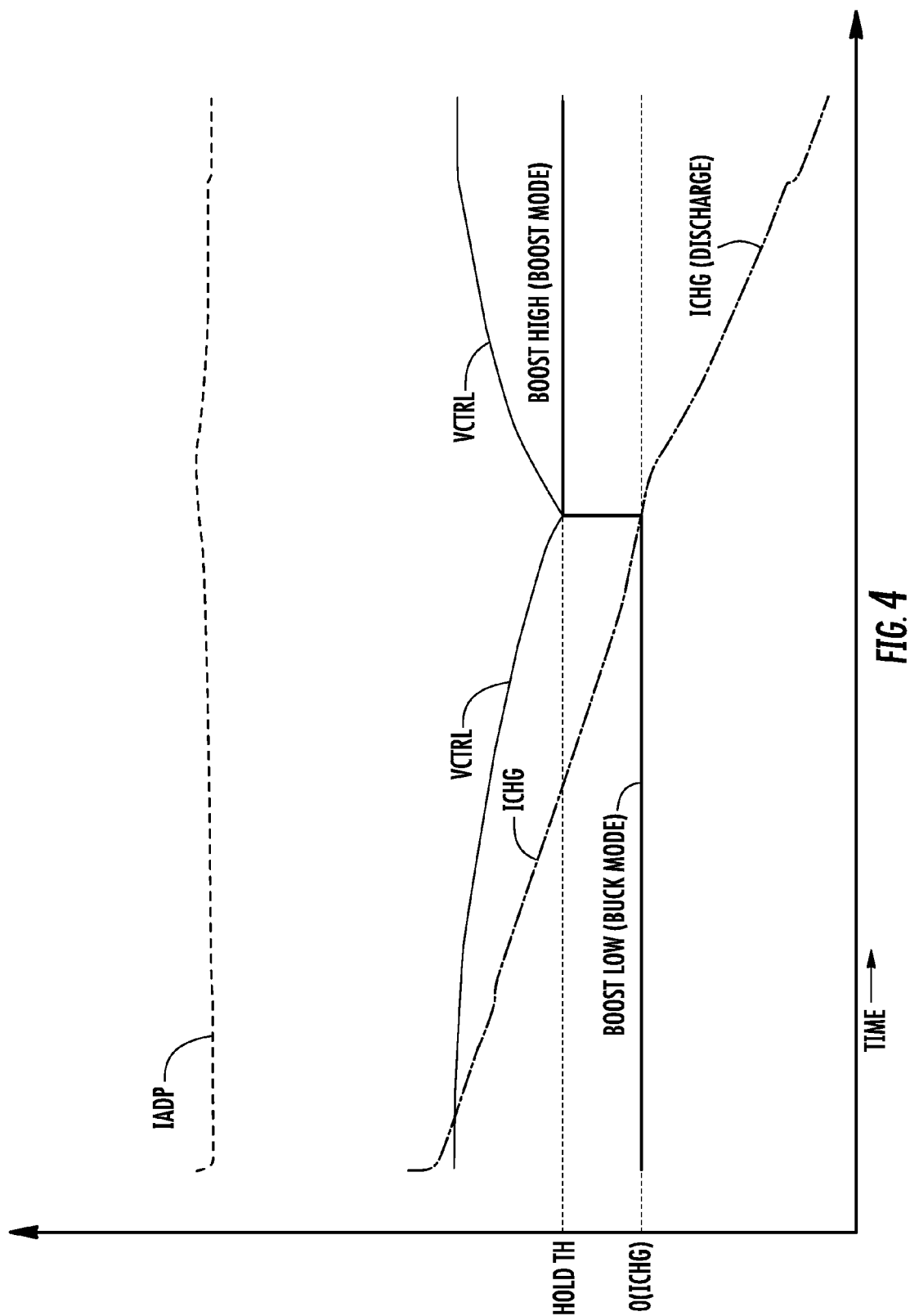
FIG. 4 is a graphic diagram plotting adapter current, battery charge current, the voltage of ICOMP and the BOOST signal illustrating a transient response according to one embodiment.

FIG. 4 is a graphic diagram plotting relative (and/or normalized) adapter current IADP, battery charge current (ICHG), VCTRL and the BOOST signal versus time illustrating a transient response of the battery charge modulator 111 according to one embodiment. In this case, the system load (e.g., ILD) increases from 3 A to 5 A with ACREF at approximately 4 A. The adapter current remains relative constant while ILD increases, so that the charging current decreases to zero in response to VCTRL dropping to HOLD TH. The BOOST signal goes high to switch to boost mode, and as ILD continues to increase, VCTRL increases to increase discharge current as indicated by ICHG going further negative below zero.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the following claim(s).

The invention claimed is:

1. A controller for controlling a switching converter of a power stage receiving current from an adapter in which the adapter also provides current to a load, wherein the switching converter switches current through an inductor and is operative in a buck mode for charging a battery and in a boost mode to boost voltage from a lower battery voltage to a higher load voltage for discharging the battery to the load, wherein the controller comprises:

a current error system which compares the adapter current with a predetermined adapter current level and which develops a control signal indicative thereof;

a modulator which develops at least one pulse control signal based on said control signal and which has an output for controlling switching of the switching converter in the buck and boost modes using said at least one pulse control signal; and a switch control system which controls said current error system and said modulator to operate the switching converter in the buck mode when the adapter current is less than or equal to said predetermined adapter current level, wherein said switch control system controls said current error system and said modulator to operate the switching converter in the boost mode when the adapter current exceeds said predetermined adapter current level, and wherein said switch control system controls said current error system and said modulator to operate the switching converter with discontinuous conduction of current through the inductor near a transition between the buck and boost modes.

2. The controller of claim 1, wherein said switch control system comprises:

a first comparator which compares an adapter current sense signal with an adapter current reference and provides a mode signal indicative thereof;

a second comparator which releases a hold signal when said control signal achieves a predetermined hold threshold; and a latch which switches between the buck and boost modes based on said mode signal when said hold signal is released.

3. The controller of claim 1, wherein said switch control system comprises quick mode change system which switches operation from said buck mode to said boost mode when the adapter current exceeds said predetermined adapter current level by a first predetermined amount for a first predetermined time period, and which switches operation from said boost mode to said buck mode when the adapter current is below said predetermined adapter current level by a second predetermined amount for a second predetermined time period.

4. The controller of claim 1, wherein said current error system compares battery current with a predetermined level and selectively adjusts said control signal.

5. The controller of claim 4, wherein said current error system adjusts said control signal to limit battery current to a predetermined maximum discharge level in the boost mode.

6. The controller of claim 1, wherein said current error system comprises:

a first amplifier which amplifies an adapter current sense value and which provides an adapter current feedback value;

a second amplifier which amplifies a battery current sense value and which provides a battery current feedback value;

a first error amplifier which receives said adapter current feedback value and an adapter reference value and which provides a first error value;

a second error amplifier which receives said battery current feedback value and a charge reference value and which provides a second error value; and first selection circuitry which selects a minimum one of said first and second error values as a current compensation value used to develop said control signal.

7. The controller of claim 6, wherein said current error system further comprises:

a third error amplifier which receives a battery voltage value and a battery voltage reference value and which provides a voltage compensation value;

second selection circuitry which selects a minimum one of said current compensation value and said voltage compensation value and which provides a selected compensation value; and a third amplifier which adjusts said selected compensation value by said battery current sense value and which provides said control signal.

8. The controller of claim 6, wherein said modulator comprises:

a pulse comparator which compares said control signal with a ramp signal and which provides a first pulse control signal; and a synchronous gate controller which receives said first pulse control signal and which provides a second pulse control signal.

9. The controller of claim 8, further comprising multiplex circuitry which swaps said adapter current feedback value and said adapter reference value, which swaps polarity of said battery current sense value, and which swaps said first pulse control signal and said second pulse control signal between said buck and boost modes.

10. The controller of claim 9, wherein said multiplex circuitry further swaps between a charge limit value and a discharge limit value for providing said charge reference value between said buck and boost modes.

11. An electronic device configured to receive adapter current, configured to couple a rechargeable battery, and having a system load, said electronic device comprising:
   a source node for receiving the adapter current and for sourcing current to the system load, and a battery node for coupling to the battery;
   a switching converter coupled to said source node and said battery node and configured to switch current through an inductor and to operate in a buck mode for charging the battery using the adapter current and to operate in a boost mode having an output voltage greater than a battery voltage for discharging the battery to said source node; and
   a converter control system, comprising:
      a current monitoring system which compares the adapter current with a predetermined adapter current level and which develops a control signal indicative thereof;
      a modulator which develops at least one pulse control signal based on said control signal and which has an output for controlling switching of said switching converter in said buck and boost modes using said at least one pulse control signal; and
      a switch control system which controls said current monitoring system and said modulator to operate said switching converter in said buck mode when the adapter current is less than or equal to said predetermined adapter current level, wherein said switch control system controls said current monitoring system and said modulator to operate said switching converter in said boost mode when the adapter current exceeds said predetermined adapter current level, and wherein said switch control system controls said current monitoring system and said modulator to operate said switching converter with discontinuous conduction of current through said inductor near a transition between said buck and boost modes.

12. The electronic device of claim 11, wherein the system load comprises a processor coupled to a memory.

13. The electronic device of claim 11, further comprising:
   a current sensor for sensing the adapter current and for providing an adapter current sense signal; and
   wherein said switch control system comprises:
      a first comparator which compares said adapter current sense signal with an adapter current reference and provides a mode signal indicative thereof;
      a second comparator which releases a hold signal when said control signal achieves a predetermined hold threshold; and
      a latch which switches between said buck and boost modes based on said mode signal when said hold signal is released.

14. The electronic device of claim 11, further comprising:
   a current sensor coupled to said battery node for sensing battery current; and
   wherein said current monitoring system compares said battery current with a predetermined discharge level to adjust said control signal to limit said battery current to a predetermined maximum discharge current in the boost mode.

15. The electronic device of claim 11, wherein:
   said current monitoring system comprises:
      a first current sensor for sensing the adapter current and for providing an adapter current sense signal; and
      a first error amplifier which compares said adapter current sense signal with an adapter reference signal and which provides a first error signal used to develop said control signal;
   wherein said modulator develops first and second pulse control signals based on said control signal; and
   wherein said switch control system comprises multiplexor circuitry which swaps said adapter current sense signal with said adapter reference signal and which swaps said first and second pulse control signals between said buck and boost modes.

16. The electronic device of claim 15, wherein:
   said current monitoring system further comprises:
      a second current sensor for sensing the battery current and for providing a battery current sense signal having first and second polarities;
      an amplifier receiving said battery current sense signal and providing a battery current feedback signal; and
      a second error amplifier which compares said battery current feedback signal with a selected battery reference signal and which provides a second error signal used to selectively adjust said control signal; and
   wherein said multiplexor circuitry further swaps said first and second polarities of said battery current sense signal and which swaps a battery charge reference signal and a battery discharge reference signal to provide said selected battery reference signal between said buck and boost modes.

17. A method of controlling a switching converter of a power stage which receives current from an adapter in which the adapter also provides current to a load, wherein the switching converter switches current through an inductor and is operative in a buck mode for charging a battery and in a boost mode to boost voltage from a lower battery voltage to a higher load voltage for discharging the battery to the load, said method comprising:
   comparing the adapter current with a predetermined adapter current level and providing a control signal indicative thereof;
   modulating at least one pulse control signal based on the control signal to control switching of the switching converter in the buck and boost modes;
   applying the at least one pulse control signal to operate the switching converter in the buck mode when the adapter current is less than or equal to the predetermined adapter current level;
   applying the at least one pulse control signal to operate the switching converter in the boost mode when the adapter current exceeds the predetermined adapter current level; and
   applying the at least one pulse control signal to operate the switching converter with discontinuous conduction of current through the inductor near a transition between the buck and boost modes.

18. The method of claim 17, further comprising:
   comparing an adapter current sense signal with an adapter current reference and providing a mode signal indicative thereof;
   releasing a hold signal when the control signal achieves a predetermined hold threshold; and
   switching between the buck and boost modes based on the mode signal when the hold signal is released.

19. The method of claim 17, further comprising:
   comparing battery current with a predetermined battery discharge current level during the boost mode; and adjusting the control signal to limit battery current to the predetermined battery discharge current level during the boost mode.

20. The method of claim 17, further comprising:
said modulating comprising modulating first and second pulse control signals based on the control signal; and
swapping adapter current and the predetermined adapter current level and swapping the first and second pulse control signals when switching between the buck and boost modes.

21. A controller for a battery charge modulator including a switching power stage receiving adapter current from an adapter in which the adapter current is further provided to a system load, wherein the switching power stage is operative to switch current through an inductor, said controller comprising:
   first detection circuitry which is configured for sensing the adapter current;
   second detection circuitry which is configured to sense a battery current;
   control circuitry for operating the switching power stage in a first mode for providing said battery current as a charge current while a total of a system load current and said charge current do not exceed a maximum adapter current level, for operating the switching power stage in a second mode when said system load current reaches or exceeds said maximum adapter current level and for increasing voltage from a lower battery voltage to a higher system load voltage and providing said battery current as a discharge current to increase an available system current above the said maximum adapter current level, and for operating the switching power stage with discontinuous conduction of current through the inductor near a transition between said first and second modes; and
   wherein said control circuitry includes battery protection circuitry which prevents said discharge current from exceeding a predetermined charge current level during said second mode.

22. The controller of claim 21, wherein said first mode is a buck mode and wherein said second mode is a boost mode.

* * * * *